(12) United States Patent
Sato et al.

(10) Patent No.: US 9,567,456 B2
(45) Date of Patent: Feb. 14, 2017

(54) RUBBER COMPOSITION FOR TIRE TREAD, AND PNEUMATIC TIRE USING SAME

(71) Applicant: The Yokohama Rubber Co., LTD., Minato-ku, Tokyo (JP)

(72) Inventors: Masaki Sato, Hiratsuka (JP); Satoshi Mihara, Hiratsuka (JP); Yoshihiro Goto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/770,436

(22) PCT Filed: Feb. 25, 2014

(86) PCT No.: PCT/JP2014/054583
§ 371 (c)(1),
(2) Date: Aug. 25, 2015

(87) PCT Pub. No.: WO2014/129661
PCT Pub. Date: Aug. 28, 2014

(65) Prior Publication Data
US 2016/0024286 A1    Jan. 28, 2016

(30) Foreign Application Priority Data
Feb. 25, 2013    (JP) .................... 2013-035015

(51) Int. Cl.
*C08L 21/00*        (2006.01)
*C08K 3/36*        (2006.01)
(Continued)

(52) U.S. Cl.
CPC . *C08L 9/06* (2013.01); *B60C 1/00* (2013.01); *B60C 1/0016* (2013.04); *C08K 3/36* (2013.01);
(Continued)

(58) Field of Classification Search
None
See application file for complete search history.

(56) References Cited

U.S. PATENT DOCUMENTS

| 6,331,605 B1 | 12/2001 | Lunginsland et al. |
| 6,608,145 B1 | 8/2003 | Lin et al. |

(Continued)

FOREIGN PATENT DOCUMENTS

| FR | 2 886 308 | 12/2006 |
| FR | 2 923 831 | 5/2009 |

(Continued)

OTHER PUBLICATIONS

International Search Report for International Application No. PCT/JP2014/054583 dated Jun. 17, 2014, 4 pages, Japan.

(Continued)

*Primary Examiner* — Vu A Nguyen
(74) *Attorney, Agent, or Firm* — Thorpe North & Western (57) ABSTRACT

Provided is a rubber composition for a tire tread containing: a diene rubber; silica in an amount of from 60 to 200 parts by mass per 100 parts by mass of the rubber; a polysiloxane represented by the average composition formula: $(A)_a(B)_b(C)_c(D)_d(R^1)_e SiO_{(4-2a-b-c-d-e)/2}$; and an alkyl triethoxysilane having an alkyl group with from 7 to 20 carbon atoms. Also provided is a pneumatic tire using this rubber composition in the tire tread.

3 Claims, 1 Drawing Sheet

(51) Int. Cl.
*C08K 5/548* (2006.01)
*B60C 1/00* (2006.01)
*C08L 9/06* (2006.01)
*C08K 5/5415* (2006.01)
*C08L 9/00* (2006.01)

(52) U.S. Cl.
CPC ............ *C08K 5/548* (2013.01); *C08K 5/5415* (2013.01); *C08L 9/00* (2013.01)

(56) References Cited

U.S. PATENT DOCUMENTS

| | | | |
|---|---|---|---|
| 8,524,823 | B2 | 9/2013 | Guy |
| 9,022,087 | B2 * | 5/2015 | Kushida ................ B60C 1/0016 152/450 |
| 2003/0088034 | A1 | 5/2003 | Luginsland |
| 2003/0109614 | A1 | 6/2003 | Luginsland et al. |
| 2006/0217473 | A1 | 9/2006 | Hergenrother et al. |
| 2009/0215948 | A1 | 8/2009 | Guy |
| 2010/0132868 | A1 * | 6/2010 | Hergenrother ....... C08K 3/0033 152/564 |
| 2011/0009547 | A1 | 1/2011 | Araujo Da Silva et al. |
| 2011/0144236 | A1 * | 6/2011 | Mihara ................ B60C 1/0016 523/158 |
| 2011/0152405 | A1 | 6/2011 | Thomasson et al. |
| 2011/0180195 | A1 | 7/2011 | Hergenrother et al. |
| 2013/0172443 | A1 | 7/2013 | Kushida et al. |
| 2014/0005431 | A1 | 1/2014 | Hirokami et al. |
| 2014/0011924 | A1 | 1/2014 | Hergenrother et al. |
| 2014/0213708 | A1 | 7/2014 | Kushida |
| 2015/0218298 | A1 | 8/2015 | Sato et al. |

FOREIGN PATENT DOCUMENTS

| | | |
|---|---|---|
| JP | 2000-038395 | 2/2000 |
| JP | 2001-192454 | 7/2001 |
| JP | 2003-113243 | 4/2003 |
| JP | 2004-511598 | 4/2004 |
| JP | 2008-537740 | 9/2008 |
| JP | 4930661 | 2/2012 |
| JP | 2012-097257 | 5/2012 |
| JP | 2014-028797 | 2/2014 |
| WO | WO 01/96442 | 12/2001 |
| WO | WO 02/31034 | 4/2002 |
| WO | WO 2004/056918 | 7/2004 |
| WO | WO 2006/102518 | 9/2006 |
| WO | WO 2006/125896 | 11/2006 |
| WO | WO 2009/062733 | 5/2009 |
| WO | WO 2012/035998 | 3/2012 |
| WO | WO 2013/031488 | 3/2013 |
| WO | WO 2014/002750 | 1/2014 |
| WO | WO 2014/034673 | 3/2014 |

OTHER PUBLICATIONS

Chenchy J. Lin, William L. Hergenrother, Ashley S. Hilton, Reduction of Volatile Organic Compound Emission. II., Use of Alkoxy-Modified Silsesquioxane for Compounding, Silica-Filled Rubbers, Journal of Applied Polymer Science, Aug. 12, 2008, pp. 655-664, vol. 115, Wiley Periodicals, Inc., Akron, Ohio, United States.

\* cited by examiner

FIG. 1

RUBBER COMPOSITION FOR TIRE TREAD, AND PNEUMATIC TIRE USING SAME

TECHNICAL FIELD

The present technology relates to a rubber composition for a tire tread and a pneumatic tire using the same.

BACKGROUND

Conventionally, there has been a demand to reduce tire rolling resistance from the perspective of low fuel consumption at the time of vehicle traveling. In addition, there has been a demand for improvements in wet performance from the perspective of safety. A known method of achieving this is a method of establishing both low rolling resistance and wet performance by adding silica to a rubber component constituting the tread part of a tire.

However, silica has low affinity with rubber components, and the cohesiveness of silica components is high, so even if silica is simply added to the rubber component, the silica is not dispersed, and which leads to the problem that the effect of reducing the rolling resistance or the effect of improving the wet performance cannot be sufficiently achieved.

Under such circumstances, the present applicant proposed a rubber composition containing a sulfur-containing silane coupling agent and an alkyl triethoxysilane as a silica dispersion technique.

In addition, there is also a demand for there to be little crosslinking (rubber burning) in the rubber composition for a tire tread at the storage stage or the stage before the vulcanization process. That is, there is a demand for excellent processability (for example, for the viscosity to be appropriate and for the scorch resistance and extrudability to be excellent; same hereafter).

In recent years, environmental issues and resource problems have led to a demand for even lower fuel consumption in vehicles, which in turn has led to a demand for further improvements in the low rolling resistance of tires. In addition, in step with improvements in the required safety level, there has also been a demand for further improvements in wet performance. Due to such reasons, there is room for improvement in the low rolling resistance or wet performance of a rubber composition containing a mercaptosilane that can react with silica.

In rubber compositions containing alkyl triethoxysilane used in the rubber composition described in Japanese Patent No. 4930661 and a conventional sulfur-containing silane coupling agent, the low rolling resistance, wet performance, and processability do not satisfy the currently required levels (this corresponds to Reference Example 1 described below).

SUMMARY

The present technology provides a rubber composition for a tire tread having excellent wet performance and low rolling resistance when formed into a tire as well as excellent processability.

A rubber composition containing a diene rubber, a silica, a sulfur-containing silane coupling agent, and an alkyl triethoxysilane represented by Formula (I); a content of the silica being from 60 to 200 parts by mass per 100 parts by mass of the diene rubber; the sulfur-containing silane coupling agent being a polysiloxane represented by Formula (1); a content of the sulfur-containing silane coupling agent being from 1 to 20 mass % of the content of the silica; and a content of the alkyl triethoxysilane being from 0.2 to 20 mass % of the content of the silica; yields a rubber tire composition for a tire tread having excellent wet performance and low rolling resistance as well as excellent processability.

(1)

[Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \le a < 1$, $0 \le b < 1$, $0 < c < 3$, $0 < d < 1$, $0 \le e < 2$, and $0 < 2a+b+c+d+e < 4$. However, either a or b is not 0.]

Formula I (I)

[In Formula (I), R is an Alkyl Group Having from 7 to 20 Carbon Atoms.]

That is, the present technology provides the following rubber composition for a tire and a pneumatic tire using the same.

1. A rubber composition for a tire tread containing a diene rubber, a silica, a sulfur-containing silane coupling agent, and an alkyl triethoxysilane represented by Formula (I);
    a content of the silica being from 60 to 200 parts by mass per 100 parts by mass of the diene rubber,
    the sulfur-containing silane coupling agent being a polysiloxane represented by the following Formula (1);
    a content of the sulfur-containing silane coupling agent being from 1 to 20 mass % relative to the content of the silica, and
    the content of the alkyl triethoxysilane being from 0.2 to 20 mass % of the content of the silica.

(1)

[Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \le a < 1$, $0 \le b < 1$, $0 < c < 3$, $0 < d < 1$, $0 \le e < 2$, and $0 < 2a+b+c+d+e < 4$. However, either a or b is not 0.]

Formula I (I)

[In Formula (I), R is an Alkyl Group Having from 7 to 20 Carbon Atoms.]

2. The rubber composition for a tire tread according to 1 described above, further containing a terpene resin, wherein an amount of the terpene resin is from 1 to 30 parts by mass per 100 parts by mass of the diene rubber, and the terpene resin is an aromatic modified terpene resin having a softening point of from 60 to 150° C.

3. The rubber composition for a tire tread according to 1 or 2 described above, wherein b is greater than 0 in Formula (1).

4. A pneumatic tire having tire treads formed using the rubber composition for a tire tread according to one of 1 to 3 described above.

According to the present technology, it is possible to provide a rubber composition for a tire tread having excellent wet performance and low rolling resistance when formed into a tire as well as excellent processability, and a pneumatic tire having tire treads formed using the rubber composition.

DETAILED DESCRIPTION

The present technology is described in detail below.

The rubber composition for a tire tread according to the present technology is:

a rubber composition for a tire tread containing a diene rubber, a silica, a sulfur-containing silane coupling agent, and an alkyl triethoxysilane represented by Formula (I);

a content of the silica being from 60 to 200 parts by mass per 100 parts by mass of the diene rubber, the sulfur-containing silane coupling agent being a polysiloxane represented by the following Formula (1);

a content of the sulfur-containing silane coupling agent being from 1 to 20 mass % relative to the content of the silica, and the content of the alkyltriethoxy silane being from 0.2 to 20 mass % of the content of the silica.

(1)

[Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $0 \leq b < 1$, $0 < c < 3$, $0 < d < 1$, $0 \leq e < 2$, and $0 < 2a+b+c+d+e < 4$. However, either a or b is not 0.]

Formula I (I)

[In Formula (I), R is an alkyl group having from 7 to 20 carbon atoms.]

The rubber composition for a tire tread according to the present technology is also referred to as the "composition of the present technology" hereinafter. In addition, the polysiloxane represented by Formula (1) is also referred to as the "polysiloxane represented by the average composition formula of Formula (1)".

The composition of the present technology has excellent wet performance, low rolling resistance, and processability as a result of using the polysiloxane represented by the average composition formula of Formula (1) as a sulfur-containing silane coupling agent and a specific alkyl triethoxysilane in a rubber composition containing a diene rubber and a silica.

In the present technology, the polysiloxane represented by the average composition formula of Formula (1) makes it possible to blend silica into the rubber composition in a large quantity and to sufficiently disperse a large amount of silica into the rubber composition.

The present inventors believe that the rubber composition for a tire according to the present technology achieves the effects described above as follows.

The skeleton of the sulfur-containing silane coupling agent contained in the rubber composition for a tire according to the present technology [polysiloxane represented by the average composition formula of Formula (1)] is a siloxane structure. In addition, when the sulfur-containing silane coupling agent has a monovalent hydrocarbon group having from 5 to 10 carbon atoms represented by B, B may function as an effective protecting group with respect to the mercapto group. Therefore, the vicinity of the mercapto group of the sulfur-containing silane coupling agent is thought to be even bulkier than a conventional mercaptosilane due to the siloxane structure of the skeleton, and also due to the presence of B when the agent contains B.

The mercapto group of the sulfur-containing silane coupling agent is protected by such a bulky structure, so the Mooney scorch time of the rubber composition for a tire tread according to the present technology is long, and the processing stability is secured.

However, in the present technology, it can be said that such a bulky structure of the sulfur-containing silane coupling agent does not inhibit the acceleration of the vulcanization rate at the time of vulcanization. It is thought that the mercapto group of the sulfur-containing silane coupling agent can interact and/or react with the diene rubber as a result of heating or the like at the time of vulcanization. Therefore, the composition of the present technology can achieve both processing stability and a fast vulcanization rate at the time of vulcanization.

In addition, the sulfur-containing silane coupling agent may have better affinity and reactivity with silica than conventional mercaptosilanes since it has a hydrolyzable group represented by C and a siloxane structure. Further, when the molecular weight of the sulfur-containing silane coupling agent is within an appropriate range, it is anticipated that the affinity and reactivity with silica will be even better. It is thought that the rubber composition for a tire according to the present technology achieves excellent wet performance and abrasion resistance due to these factors.

In addition, in the present technology, the specific alkyl triethoxysilane promotes the dispersibility of the silica, and this accelerates the reaction (silanization) between the silica and the sulfur-containing silane coupling agent, which is thought to lead to a further improvement in the dispersibility of the silica. Further, it is thought that the alkyl triethoxysilane can interact with the diene rubber (specifically, SBR) so as to accelerate the reaction between the sulfur-containing silane coupling agent and the diene rubber.

Due to such reasons, in the present technology, a rubber composition containing an alkyl triethoxysilane has excellent processability and suppresses the coagulation of the silica or increases in viscosity, and the composition of the present technology can be used to produce a tire having excellent wet performance and low rolling resistance.

The above mechanism is an inference by the inventors of the present application, but if the mechanism is a mechanism other than that described above, it is still within the scope of the present technology.

The diene rubber contained in the composition of the present technology is not particularly limited. Examples thereof include styrene butadiene copolymer rubber (SBR), natural rubber (NR), isoprene rubber (IR), butadiene rubber (BR), chloroprene rubber (CR), acrylonitrile butadiene rubber (NBR), ethylene-propylene-diene copolymer rubber (EPDM), styrene-isoprene rubber, isoprene-butadiene rubber, nitrile rubber, and halogenated nitrile rubber.

A single diene rubber can be used, or a combination of two or more types can be used.

Of these, the diene rubber is preferably SBR and/or BR in that a tire with superior wet performance and low rolling resistance can be produced and that the abrasion resistance is favorable.

The SBR is not particularly limited. The SBR may be modified by a hydroxy group, a polyorganosiloxane group, a carbonyl group, an amino group, or the like.

The weight average molecular weight of the SBR is preferably from 500,000 to 2,000,000 and more preferably from 700,000 to 1,500,000 from the perspective of being able to achieve both grip performance and processability. In the present technology, the weight average molecular weight of the SBR is determined in terms of polystyrene by gel permeation chromatography (GPC) using toluene as a solvent.

The SBR preferably contains from 30 to 50 mass % of an aromatic vinyl (called the "styrene quantity" hereafter) and has a vinyl bond content of from 20 to 70 mass % in the conjugated diene in order to be able to produce a tire having superior wet performance and low rolling resistance.

The content (proportion) of the SBR is preferably at least 50 mass % and more preferably at least 60 mass % of the diene rubber in order to be able to produce a tire having superior wet performance and low rolling resistance.

The silica contained in the composition of the present technology is not particularly limited, and any conventionally known silica that is blended into rubber compositions in applications such as tires can be used.

Specific examples of the silica include fumed silica, calcined silica, precipitated silica, ground silica, fused silica, and colloidal silica. A single silica can be used, or a combination of two or more types can be used.

The CTAB adsorption specific surface area of the silica is preferably greater than 160 m$^2$/g and more preferably from 170 to 230 m$^2$/g from the perspective of having superior wet performance and excellent abrasion resistance. Here, the CTAB adsorption specific surface area was measured in accordance with the CTAB adsorption method described in JIS K6217-3:2001.

In the present technology, the content of the silica is from 60 to 200 parts by mass per 100 parts by mass of the diene rubber and is preferably from 60 to 150 parts by mass and more preferably from 70 to 140 parts by mass in that the wet performance and low rolling resistance of the resulting tire are better and the abrasion resistance and strength also improve.

The sulfur-containing silane coupling agent contained in the composition of the present technology will be described hereinafter. The sulfur-containing silane coupling agent contained in the composition of the present technology is a polysiloxane represented by the following Formula (1).

$$(A)_a(B)_b(C)_c(D)_d(R^1)_e SiO_{(4-2a-b-c-d-e)/2} \quad (1)$$

[Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $0 \leq b < 1$, $0 < c < 3$, $0 < d < 1$, $0 \leq e < 2$, and $0 < 2a+b+c+d+e < 4$. However, either a or b is not 0.]

In the present technology, since the sulfur-containing silane coupling agent contains C, it has excellent affinity and/or reactivity with silica.

Since the sulfur-containing silane coupling agent contains D, it can interact and/or react with the diene rubber, which yields excellent wet performance and abrasion resistance.

When the sulfur-containing silane coupling agent has A, the wet performance and processability (in particular, the maintenance and prolongation of the Mooney scorch time) are superior, and the abrasion resistance is excellent.

When the sulfur-containing silane coupling agent contains B, the mercapto group is protected, and the Mooney scorch time becomes longer, while at the same time, the processability is excellent due to outstanding affinity with the rubber.

The sulfur-containing silane coupling agent contained in the composition of the present technology has a siloxane skeleton as its skeleton.

In Formula (1), A is a divalent organic group containing a sulfide group (also called a sulfide group-containing organic group hereafter). Of these, a group represented by Formula (2) is preferable.

$$*-(CH_2)_n-S_x-(CH_2)_n-* \quad (2)$$

In Formula (2), n is an integer from 1 to 10, among which an integer from 2 to 4 is preferable.

In Formula (2), x is an integer from 1 to 6, among which an integer from 2 to 4 is preferable.

In Formula (2), *indicates a bond position.

Specific examples of the group represented by Formula (2) include $*-CH_2-S_2-CH_2-*$, $*-C_2H_4-S_2-C_2H_4-*$, $*-C_3H_6-S_2-C_3H_6-*$, $*-C_4H_8-S_2-C_4H_8-*$, $*-CH_2-S_4-CH_2-*$, $*-C_2H_4-S_4-C_2H_4-*$, $*-C_3H_6-S_4-C_3H_6-*$, and $*-C_4H_8-S_4-C_4H_8-*$.

In Formula (1), B is a monovalent hydrocarbon group having from 5 to 10 carbon atoms, specific examples of which include hexyl groups, octyl groups, and decyl groups. Of these, B is preferably a monovalent hydrocarbon group having from 8 to 10 carbon atoms from the perspective of protecting the mercapto group, having a long Mooney scorch time, having superior processability, and having superior wet characteristics and low rolling resistance.

In Formula (1), C is a hydrolyzable group, specific examples of which include alkoxy groups, phenoxy groups, carboxyl groups, and alkenyloxy groups. Of these, a group represented by the following Formula (3) is preferable.

$$*-OR^2 \quad (3)$$

In Formula (3), $R^2$ is an alkyl group having from 1 to 20 carbon atoms, an aryl group having from 6 to 10 carbon atoms, an aralkyl group (aryl alkyl group) having from 6 to 10 carbon atoms, or an alkenyl group having from 2 to 10 carbon atoms, among which an alkyl group having from 1 to 5 carbon atoms is preferable. Specific examples of the alkyl group having from 1 to 20 carbons include a methyl group, an ethyl group, a propyl group, a butyl group, a hexyl group, an octyl group, a decyl group, an octadecyl group, and the like. Specific examples of the aryl group having from 6 to 10 carbons include a phenyl group, a tolyl group, and the like. Specific examples of the aralkyl group having from 6 to 10 carbons include a benzyl group, a phenylethyl group, and the like. Specific examples of alkenyl groups having from 2 to 10 carbon atoms include vinyl groups, propenyl groups, and pentenyl groups.

In Formula (3), *indicates a bond position In Formula (1), D is an organic group containing a mercapto group. Of these, a group represented by the following Formula (4) is preferable.

*—$(CH_2)_m$—SH　　(4)

In Formula (4), m is an integer from 1 to 10, among which an integer from 1 to 5 is preferable.

In Formula (4), *indicates a bond position.

Specific examples of the group represented by Formula (4) include *—$CH_2SH$, *—$C_2H_4SH$, *—$C_3H_6SH$, *—$C_4H_8SH$, *—$C_5H_{10}SH$, *—$C_6H_{12}SH$, *—$C_7H_{14}SH$, *—$C_8H_{16}SH$, *—$C_9H_{18}SH$, and *—$C_{10}H_{20}SH$.

In Formula (1), $R^1$ is a monovalent hydrocarbon group having from 1 to 4 carbon atoms.

In Formula (1), a to e satisfy the relational expressions $0 \le a<1$, $0 \le b<1$, $0<c<3$, $0<d<1$, $0 \le e<2$, and $0<2a+b+c+d+e<4$. However, either a or b is not 0.

The value of (a) of the polysiloxane represented by the average composition formula of Formula (1) is preferably greater than 0 ($0<a$) in that the resulting processability is superior. That is, the substance preferably has a sulfide group-containing organic group.

Of these, it is preferable for the expression $0<a \le 0.50$ to be satisfied in that the processability is even better and the wet performance and low rolling resistance are also superior.

In addition, the value of (a) of the polysiloxane represented by the average composition formula of Formula (1) is preferably 0 in that the wet performance and low rolling resistance are superior. That is, a case in which the substance does not have a sulfide-containing organic group is a preferred aspect.

In Formula (1), b is preferably greater than 0 and preferably satisfies the expression $0.10 \le b \le 0.89$ in that the wet characteristics, low rolling resistance, and processability are superior.

In Formula (1), c preferably satisfies the expression $1.2 \le c \le 2.0$ in that the wet characteristics, low rolling resistance, and processability are superior and the silica dispersibility is superior.

In Formula (1), d preferably satisfies the expression $0.1<d<0.8$ in that the wet characteristics, low rolling resistance, and processability are superior.

The polysiloxane represented by the average composition formula of Formula (1) is preferably a polysiloxane in which, in Formula (1), A is a group represented by Formula (2), C in Formula (1) is a group represented by Formula (3), and D in Formula (1) is a group represented by Formula (4) in that the silica dispersibility is good and the processability is superior.

The weight average molecular weight of the polysiloxane represented by the average composition formula of Formula (1) is preferably from 500 to 2,300 and more preferably from 600 to 1,500 from the perspective of having superior wet performance, low rolling resistance, and processability. The molecular weight of the polysiloxane is the weight average molecular weight determined in terms of polystyrene by gel permeation chromatography (GPC) using toluene as a solvent.

The mercapto equivalent weight of the polysiloxane determined by the acetic acid/potassium iodide/potassium iodate addition-sodium thiosulfate solution titration method is preferably from 550 to 1900 g/mol and more preferably from 600 to 1800 g/mol, from the perspective of having excellent vulcanization reactivity.

The method for producing the polysiloxane is not particularly limited. For example, it may be produced by hydrolyzing and condensing an organosilicon compound containing at least a silane coupling agent having a mercapto group as a starting material.

A specific example is a method of hydrolyzing and condensing an organosilicon compound represented by the following Formula (6) (for example, p=5 to 10) and an organosilicon compound represented by the following Formula (7). Further, an organosilicon compound represented by the following Formula (5) may also be used. In addition, an organosilicon compound represented by Formula (6) (for example, p=1 to 4) may also be used.

Of these, it is preferable to use at least an organosilicon compound represented by Formula (6) (for example, p=5 to 10) and organosilicon compounds represented by Formula (7) and Formula (5) in that the scorch resistance is superior.

In addition, it is preferable to use at least an organosilicon compound represented by Formula (6) (for example, p=5 to 10) and an organosilicon compound represented by Formula (7) in that the wet performance is superior.

Formula 5

$(R^{51}O)_y$—$\underset{\underset{(R^{52})_{3-y}}{|}}{Si}$—$(CH_2)_n$—$S_x$—$(CH_2)_n$—$\underset{\underset{(R^{52})_{3-y}}{|}}{Si}$—$(OR^{51})_y$　　(5)

In Formula (5), $R^{51}$ is an alkyl group having from 1 to 20 carbon atoms, an aryl group having from 6 to 10 carbon atoms, or an alkenyl group having from 2 to 10 carbon atoms, among which an alkyl group having from 1 to 5 carbon atoms is preferable. Specific examples of the alkyl group having from 1 to 20 carbons include a methyl group, an ethyl group, a propyl group, a butyl group, a hexyl group, an octyl group, a decyl group, an octadecyl group, and the like. Specific examples of aryl groups having from 6 to 10 carbon atoms include phenyl groups, tolyl groups, and naphthyl groups. Specific examples of alkenyl groups having from 2 to 10 carbon atoms include vinyl groups, propenyl groups, and pentenyl groups.

In Formula (5), $R^{52}$ is an alkyl group having from 1 to 10 carbon atoms or an aryl group having from 6 to 10 carbon atoms. Specific examples of alkyl groups having from 1 to 10 carbon atoms include methyl groups, ethyl groups, propyl groups, butyl groups, hexyl groups, octyl groups, and decyl groups. Specific examples of aryl groups having from 6 to 10 carbon atoms are the same as those of $R^{51}$ described above.

In Formula (5), the definition and preferred aspects of n are the same as those of n described above.

In Formula (5), the definition and preferred aspects of x are the same as those of x described above.

In Formula (5), y is an integer from 1 to 3.

Specific examples of the organosilicon compound represented by Formula (5) include bis(trimethoxysilylpropyl)

tetrasulfide, bis(triethoxysilylpropyl)tetrasulfide, bis(trimethoxysilylpropyl)disulfide, and bis(triethoxysilylpropyl)disulfide.

Formula 6

In Formula (6), the definition, specific examples, and preferred aspects of $R^{61}$ are the same as those of $R^{51}$ described above.

In Formula (6), the definition, specific examples, and preferred aspects of $R^{62}$ are the same as those of $R^{52}$ described above.

In Formula (6), the definition of z is the same as that of y described above.

In Formula (6), p is an integer from 1 to 10. Here, p is preferably an integer from 5 to 10 from the perspective of having superior wet performance, low rolling resistance, and processability and having excellent affinity with the diene rubber.

Specific examples of the organosilicon compound represented by

Formula (6) (p is an integer from 5 to 10) include pentyltrimethoxysilane, pentylmethyldimethoxysilane, pentyltriethoxysilane, pentylmethyldiethoxysilane, hexyltrimethoxysilane, hexylmethyldimethoxysilane, hexyltriethoxysilane, hexylmethyldiethoxysilane, octyltrimethoxysilane, octylmethyldimethoxysilane, octyltriethoxysilane, octylmethyldiethoxysilane, decyltrimethoxysilane, decylmethyldimethoxysilane, decyltriethoxysilane, and decylmethyldiethoxysilane.

Specific examples of the organosilicon compound represented by Formula (6) (p is an integer from 1 to 4) include methyltrimethoxysilane, dimethyldimethoxysilane, methyltriethoxysilane, methylethyldiethoxysilane, propyltrimethoxysilane, propylmethyldimethoxysilane, and propylmethyldiethoxysilane.

As the organosilicon compound represented by Formula (6), an organosilicon compound in which p is an integer from 1 to 4 and/or an organosilicon compound in which p is an integer from 5 to 10 can be used.

Formula 7

In Formula (7), the definition, specific examples, and preferred aspects of $R^{71}$ are the same as those of $R^{51}$ described above.

In Formula (7), the definition, specific examples, and preferred aspects of $R^{72}$ are the same as those of $R^{52}$ described above.

In Formula (7), the definition and preferred aspects of m are the same as those of m described above.

In Formula (7), the definition of w is the same as that of y described above.

Specific examples of the organosilicon compound represented by Formula (7) include α-mercaptomethyltrimethoxysilane, α-mercaptomethylmethyldimethoxysilane, α-mercaptomethyltriethoxysilane, α-mercaptomethylmethyldiethoxysilane, γ-mercaptopropyltrimethoxysilane, γ-mercaptopropylmethyldimethoxysilane, γ-mercaptopropyltriethoxysilane, and γ-mercaptopropylmethyldiethoxysilane.

When a silane coupling agent having a mercapto group [for example, an organosilicon compound represented by Formula (7)] and a silane coupling agent other than a silane coupling agent having a sulfide group or a mercapto group [for example, an organosilicon compound represented by Formula (6)] are used in combination as the organosilicon compounds used to produce the polysiloxane, the mixing ratio (molar ratio) of the silane coupling agent having a mercapto group and the silane coupling agent other than a silane coupling agent having a sulfide group or a mercapto group (silane coupling agent having a mercapto group/silane coupling agent other than a silane coupling agent having a sulfide group or a mercapto group) is preferably from 1.1/8.9 to 6.7/3.3 and more preferably from 1.4/8.6 to 5.0/5.0 from the perspective of having superior wet performance, low rolling resistance, and processability.

When a silane coupling agent having a mercapto group [for example, an organosilicon compound represented by Formula (7)] and a silane coupling agent having a sulfide group [for example, an organosilicon compound represented by Formula (5)] are used in combination as the organosilicon compounds used to produce the polysiloxane, the mixing ratio (molar ratio) of the silane coupling agent having a mercapto group and the silane coupling agent having a sulfide group (silane coupling agent having a mercapto group/silane coupling agent having a sulfide group) is preferably from 2.0/8.0 to 8.9/1.1 and more preferably from 2.5/7.5 to 8.0/2.0 from the perspective of having superior wet performance, low rolling resistance, and processability.

When a silane coupling agent having a mercapto group [for example, an organosilicon compound represented by Formula (7)], a silane coupling agent having a sulfide group [for example, an organosilicon compound represented by Formula (5)], and a silane coupling agent other than a silane coupling agent having a sulfide group or a mercapto group [for example, an organosilicon compound represented by Formula (6)] are used in combination as the organosilicon compounds used to produce the polysiloxane, the amount of the silane coupling agent having a mercapto group is preferably from 10.0 to 73.0% of the total amount (moles) of the three silane coupling agents listed above. The amount of the silane coupling agent having a sulfide group is preferably from 5.0 to 67.0% of the total amount of the three agents listed above. The amount of the silane coupling agent other than a silane coupling agent having a sulfide group or a mercapto group is preferably from 16.0 to 85.0% of the total amount of the three agents listed above.

A solvent may be used as necessary when producing the polysiloxane described above. The solvent is not particularly limited, but specific examples include aliphatic hydrocarbon solvents such as pentane, hexane, heptane, and decane, ether solvents such as diethyl ether, tetrahydrofuran, and 1,4-dioxane, amide solvents such as formamide, dimethylformamide, and N-methylpyrrolidone, aromatic hydrocarbon solvents such as benzene, toluene, and xylene, and alcohol solvents such as methanol, ethanol, and propanol.

In addition, a catalyst may be used as necessary when producing the polysiloxane described above.

In the present technology, examples of catalysts that can be used include acidic catalysts such as hydrochloric acid and acetic acid; Lewis acid catalysts such as ammonium fluoride; alkali metal salts such as sodium hydroxide, potassium hydroxide, sodium carbonate, sodium acetate, potassium acetate, sodium hydrogen carbonate, potassium carbonate, potassium hydrogen carbonate, calcium carbonate, sodium methoxide, and sodium ethoxide; alkali earth metal salts; and amine compounds such as triethylamine, tributylamine, pyridine, and 4-dimethylaminopyridine.

The catalyst described above is preferably not an organic metal compound containing Sn, Ti, or Al as a metal. When such an organic metal compound is used, the metal is introduced into the polysiloxane skeleton, and it may not be possible to obtain the specific polysiloxane described above (in which no metals other than silicon atoms (for example, Sn, Ti, or Al) are present in the skeleton).

When an organic metal compound containing Sn, Ti, or Al is not used as a catalyst, metals derived from the catalyst are not introduced into the molecules of the polysiloxane (for example, metals are not introduced into the polysiloxane skeleton), and composition of the present technology is not hardened or gelified by moisture in the air in either a normal atmosphere or a high-humidity environment, which yields excellent storage stability.

The amount of the catalyst is preferably from 0.01 to 10 parts by mass and more preferably from 0.05 to 1 part by mass per 100 parts by mass of the organosilicon compound used as a starting material from the perspective of having superior wet performance, low rolling resistance, and processability and having excellent storage stability.

The sulfur-containing silane coupling agent can be used alone or as a combination of two or more types.

In the composition of the present technology, the content of the sulfur-containing silane coupling agent is from 1 to 20 mass % of the content of the silica and is preferably from 2 to 20 mass %, more preferably from 3 to 18 mass %, even more preferably from 4 to 16 mass %, and particularly preferably from 5 to 14 mass % from the perspective of having superior wet performance, low rolling resistance, and processability.

The alkyl triethoxysilane contained in the composition of the present technology is an alkyl triethoxysilane represented by the following Formula (I).

Formula I (I)

[In Formula (I), R is an alkyl group having from 7 to 20 carbon atoms.]

In the present technology, using a rubber composition containing the alkyl triethoxysilane described above suppresses the coagulation of the silica or increases in viscosity and makes it possible to produce a tire having excellent wet performance and low rolling resistance.

Although the details of this mechanism are not clear, this is thought to be due to the fact that the alkyl triethoxysilane promotes the dispersion of the silica and thereby accelerates the reaction (silanization) between the silica and the sulfur-containing silane coupling agent, which leads to a further improvement in the dispersibility of the silica, and the fact that the reaction between the sulfur-containing silane coupling agent and the diene rubber can be accelerated by the interaction of the alkyl triethoxysilane with the diene rubber (in particular, SBR).

In Formula (I), examples of the alkyl group having from 7 to 20 carbon atoms represented by R include heptyl groups, octyl groups, nonyl groups, decyl groups, undecyl groups, and dodecyl groups.

Of these, alkyl groups having from 8 to 10 carbon atoms are preferable, and octyl groups and nonyl groups are more preferable from the perspective of the compatibility with the diene rubber.

In the present technology, the content of the alkyl triethoxysilane is from 0.2 to 20 mass % of the content of the silica and is more preferably from 0.5 to 15 mass % and even more preferably from 1.0 to 10 mass % from the perspective of having superior wet performance, low rolling resistance, and processability and having excellent abrasion resistance.

The composition of the present technology preferably further contains a terpene resin in that that balance of the wet performance, low rolling resistance, and processability is superior.

The terpene resin is preferably an aromatic modified terpene resin. The terpene resin and aromatic modified terpene resin are not particularly limited. Examples thereof include conventionally known substances.

The softening point of the terpene resin (in particular, an aromatic modified terpene resin) is preferably from 60 to 150° C. and more preferably from 70 to 130° C. from the perspective of having superior wet performance, low rolling resistance, and processability.

The terpene resin may be used alone or as a combination of two or more types.

The amount of the terpene resin is preferably from 1 to 30 parts by mass and more preferably from 3 to 20 parts by mass per 100 parts by mass of the diene rubber component from the perspective of having superior wet performance, low rolling resistance, and processability.

The composition of the present technology may further contain additives as necessary within a scope that does not inhibit the effect or purpose thereof. Examples of additives include various additives typically used in rubber compositions for tire treads such as silane coupling agents other than the sulfur-containing silane coupling agent contained in the composition of the present technology, silane compounds other than the alkyl triethoxysilane represented by Formula (I), fillers other than silica (for example, carbon black), zinc oxide, stearic acid, antiaging agents, processing aids, aroma oils, process oils, liquid polymers, thermosetting resins, vulcanizing agents, and vulcanization accelerators.

The method for producing the composition of the present technology is not particularly limited, and specific examples thereof include a method whereby each of the above-mentioned components is kneaded using a publicly known method and device (e.g. Banbury mixer, kneader, roll, and the like).

In addition, the composition of the present technology can be vulcanized or crosslinked under conventional, publicly known vulcanizing or crosslinking conditions.

Next, the pneumatic tire of the present technology will be described.

The pneumatic tire of the present technology is a pneumatic tire having tire treads formed by using the rubber composition for a tire tread according to the present technology.

Figure 1:
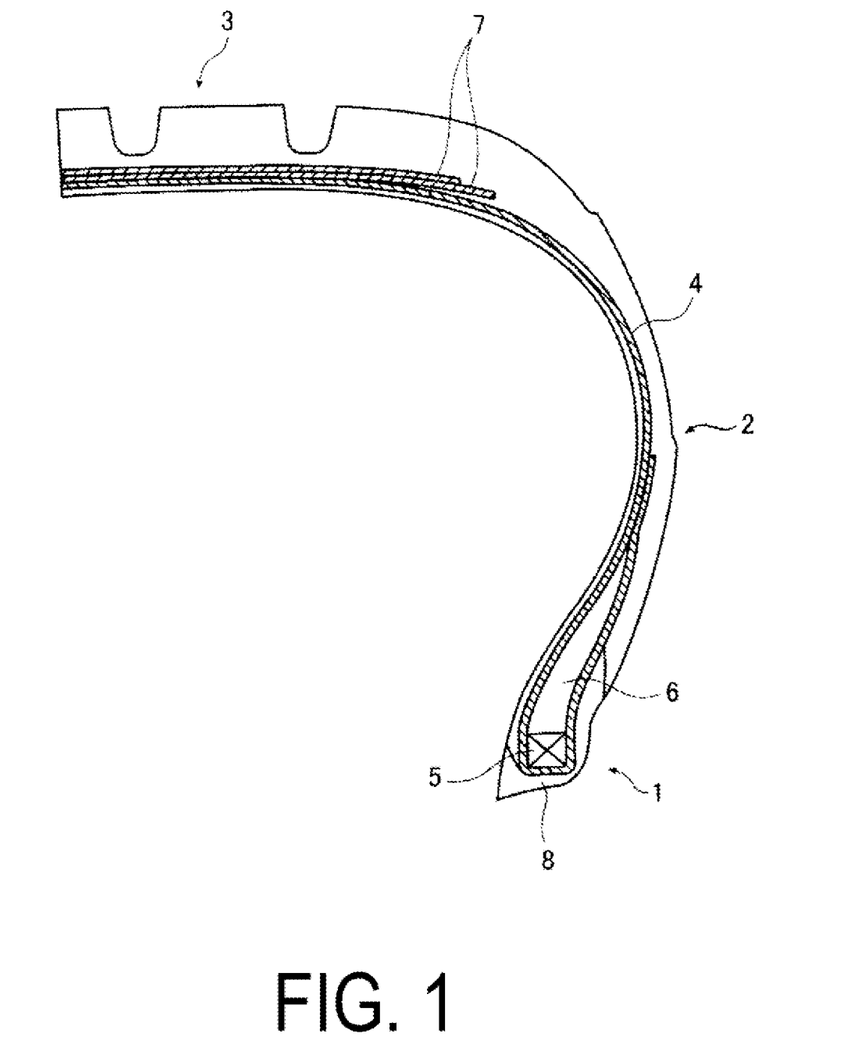
FIG. 1 is a partial cross-sectional schematic view of a tire that represents one embodiment of the pneumatic tire of the present technology.

The pneumatic tire of the present technology will be described hereinafter with reference to the attached drawings. The pneumatic tire of the present technology is not limited to the attached drawings.

FIG. 1 is a partial cross-sectional schematic view of a tire that represents one embodiment of the pneumatic tire of the present technology.

In FIG. 1, reference number 1 denotes a bead portion, reference number 2 denotes a sidewall portion, and reference number 3 denotes a tire tread.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The pneumatic tire of the present technology is not particularly limited with the exception that the composition of the present technology is used for the tire treads of a pneumatic tire, and, for example, the tire can be produced with a conventionally known method. In addition to ordinary air or air with an adjusted oxygen partial pressure, inert gasses such as nitrogen, argon, and helium can be used as the gas with which the tire is filled.

EXAMPLES

The present technology will be described in further detail hereinafter using working examples. The present technology is not limited to these working examples.
<Production Method for Polysiloxane 1>
107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2 L separable flask provided with an agitator, a reflux condenser, a dropping funnel and a thermometer, and then a mixed solution containing 37.8 g (2.1 mol) of 0.5 N hydrochloric acid and 75.6 g of ethanol was added in a dropwise manner at room temperature. It was then stirred for 2 hours at 80° C. Then, it was filtered, and 17.0 g of 5% KOH/EtOH solution was added in a dropwise manner, and stirred for 2 hours at 80° C. Then, by vacuum concentration and filtration, 480.1 g of polysiloxane in the form of a brown transparent liquid was obtained. As a result of performing measurements by GCP, the average molecular weight of the obtained polysiloxane was 840, and the average degree of polymerization was 4.0 (preset degree of polymerization: 4.0). In addition, as a result of measuring the mercapto equivalent weight of the obtained polysiloxane by an acetic acid/potassium iodide/potassium iodate addition/sodium thiosulfate solution titration method, the mercapto equivalent weight was 730 g/mol, and it was thus confirmed that the preset mercapto group content was achieved. The polysiloxane obtained as described above is represented by the following average composition formula.

The obtained polysiloxane was used as polysiloxane 1.
<Production Method for Polysiloxane 2>
190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 162.0 g of ethanol were placed in a 2 L separable flask provided with an agitator, a reflux condenser, a dropping funnel and a thermometer, and then a mixed solution containing 32.4 g (1.8 mol) of 0.5 N hydrochloric acid and 75.6 g of ethanol was added in a dropwise manner at room temperature. It was then stirred for 2 hours at 80° C. Then, it was filtered, and 14.6 g of 5% KOH/EtOH solution was added in a dropwise manner, and stirred for 2 hours at 80° C. Then, by vacuum concentration and filtration, 412.3 g of polysiloxane in the form of a colorless transparent liquid was obtained. As a result of performing measurements by GPC, the average molecular weight of the obtained polysiloxane was 850, and the average degree of polymerization was 4.0 (preset degree of polymerization: 4.0). In addition, the mercapto equivalent weight of the polysiloxane measured by an acetic acid/potassium iodide/potassium iodate addition/sodium thiosulfate solution titration method was 650 g/mol, and it was thus confirmed that the preset mercapto group content was achieved. The polysiloxane obtained as described above is represented by the following average composition formula.

The obtained polysiloxane was used as polysiloxane 2.
<Production Method for Polysiloxane 3>
107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2 separable flask provided with an agitator, a reflux condenser, a dropping funnel and a thermometer, and then a mixed solution containing 42.0 g (2.33 mol) of 0.5 N hydrochloric acid and 75.6 g of ethanol was added in a dropwise manner at room temperature. It was then stirred for 2 hours at 80° C. Then, it was filtered, and 18.9 g of 5% KOH/EtOH solution was added in a dropwise manner, and stirred for 2 hours at 80° C. Then, by vacuum concentration and filtration, 560.9 g of polysiloxane in the form of a brown transparent liquid was obtained. As a result of performing measurements by GPC, the average molecular weight of the obtained polysiloxane was 1220, and the average degree of polymerization was 6.0 (preset degree of polymerization: 6.0). In addition, the mercapto equivalent weight of the polysiloxane measured by an acetic acid/potassium iodide/potassium iodate addition/sodium thiosulfate solution titration method was 710 g/mol, and it was thus confirmed that the preset mercapto group content was achieved. The polysiloxane obtained as described above is represented by the following average composition formula.

The obtained polysiloxane was used as polysiloxane 3.
(Comparative Polysiloxane 1)
A polysiloxane was obtained by hydrolyzing 3-mercaptopropyltrimethoxysilane (0.1 mol) with water and a concentrated hydrochloric acid aqueous solution and then adding and condensing ethoxymethylpolysiloxane (100 g). The obtained polysiloxane was used as comparative polysiloxane 1.

The comparative polysiloxane 1 has a structure in which the methoxy groups of 3-mercaptopropyltrimethoxysilane and the ethoxy groups of ethoxymethylpolysiloxane are condensed. That is, the only monovalent hydrocarbon group of the comparative polysiloxane 1 is a methyl group. In addition, the comparative polysiloxane 1 does not have a divalent organic group containing a sulfide group.

(Comparative Polysiloxane 2)

A polysiloxane was obtained by hydrolyzing bis(3-(triethoxysilyl)propyl)tetrasulfide (0.1 mol) with water and a concentrated hydrochloric acid aqueous solution and then adding and condensing ethoxymethylpolysiloxane (100 g). The obtained polysiloxane was used as comparative polysiloxane 2.

The comparative polysiloxane 2 has a structure in which the ethoxy groups of bis(3-(triethoxysilyl)propyl)tetrasulfide and the ethoxy groups of ethoxymethylpolysiloxane are condensed. That is, the only monovalent hydrocarbon group of the comparative polysiloxane 2 is a methyl group. In addition, the comparative polysiloxane 2 does not have a divalent organic group containing a mercapto group.

<Production of the Rubber Composition for Tire Treads>

The components shown in the following table were blended at the proportions (parts by mass) shown in the table.

Specifically, a master batch was obtained by first mixing the components shown in the following table, excluding the sulfur and the vulcanization accelerator, for 10 minutes in a 1.7-liter closed-type Banbury mixer, discharging the mixture, and then cooling the mixture to room temperature. Further, sulfur and a vulcanization accelerator were mixed into the resulting master batch using the Banbury mixer described above so as to obtain a rubber composition for a tire tread.

In the table, the numerical values in parentheses in the rows of the comparative silane coupling agents 1 and 2, the silane coupling agents 1 to 3, the comparative alkylsilane 1, and the alkylsilane 1 indicate the mass % of each component with respect to the amount of silica.

The following evaluations were performed using the rubber composition for a tire tread produced as described above. The results are shown in the tables below.

<tan δ (0° C.)>(Indicator of Wet Performance)

A vulcanized rubber sheet was produced by press-vulcanizing the rubber composition for a tire tread (unvulcanized) produced as described above for 20 minutes at 160° C. in a metal mold (15 cm×15 cm×0.2 cm).

The value of tan δ (0° C.) was measured for the produced vulcanized rubber sheet under conditions with an elongation deformation distortion of 10%±2%, an oscillation frequency of 20 Hz, and a temperature of 0° C. using a viscoelastic spectrometer (produced by Iwamoto Manufacturing) in accordance with JIS K6394:2007.

The results are displayed as an index when the value of tan δ (0° C.) of a reference example is defined as 100. Larger indexes indicate larger tan δ (0° C.) values, which in turn indicates excellent wet performance when used in a tire.

<tan δ (60° C.)>(Indicator of Low Rolling Resistance)

A vulcanized rubber sheet was produced by press-vulcanizing the rubber composition for a tire tread (unvulcanized) produced as described above for 20 minutes at 160° C. in a metal mold (15 cm×15 cm×0.2 cm).

The value of tan δ (60° C.) was measured for the produced vulcanized rubber sheet under conditions with an elongation deformation strain of 10%±2%, an oscillation frequency of 20 Hz, and a temperature of 60° C. using a viscoelastic spectrometer (produced by Iwamoto Manufacturing) in accordance with JIS K6394:2007.

The results are displayed as an index when the value of tan δ (60° C.) of a reference example is defined as 100. Smaller index values indicate smaller tan δ (60° C.) values, which in turn indicates excellent low rolling resistance when used in a pneumatic tire.

<Mooney Viscosity>

The Mooney viscosity of the rubber composition (unvulcanized) for a tire tread produced as described above was measured under conditions with a preheating time of 1 minute, a rotor rotation time of 4 minutes, and a test temperature of 100° C. using an L-shaped rotor in accordance with JIS K6300-1:2001.

The results are displayed as an index when the value of a reference example is defined as 100.

<Mooney Scorch>(Indicator of Scorch Resistance)

The scorch time of the rubber composition (unvulcanized) for a tire tread produced as described above was measured under conditions with a test temperature of 125° C. using an L-shaped rotor in accordance with JIS K6300-1:2001.

The results are displayed as an index when the scorch time of a reference example is defined as 100. Larger indexes indicate longer scorch times, which in turn indicates excellent scorch resistance (processability).

TABLE 1

|  | Reference example | Comparative Example 1 | Comparative Example 2 | Comparative Example 3 | Comparative Example 4 |
|---|---|---|---|---|---|
| SBR (rubber content shown in parentheses) | 96.3 (70) | 96.3 (70) | 96.3 (70) | 96.3 (70) | 96.3 (70) |
| BR | 30 | 30 | 30 | 30 | 30 |
| Silica | 80 | 80 | 80 | 80 | 80 |
| Carbon black | 10 | 10 | 10 | 10 | 10 |
| Comparative silane coupling agent 1 | 8.8 (11%) | 8.8 (11%) | 8.8 (11%) |  |  |
| Comparative silane coupling agent 2 |  |  |  | 8.8 (11%) | 8.8 (11%) |
| Silane coupling agent 1 |  |  |  |  |  |
| Silane coupling agent 2 |  |  |  |  |  |
| Silane coupling agent 3 |  |  |  |  |  |
| Comparative silane coupling agent 3 |  |  |  |  |  |
| Comparative silane coupling agent 4 |  |  |  |  |  |
| Comparative alkylsilane 1 |  |  | 2.4 (3%) |  | 2.4 (3%) |
| Alkylsilane 1 |  | 2.4 (3%) |  |  |  |
| Stearic acid | 2.5 | 2.5 | 2.5 | 2.5 | 2.5 |
| Zinc oxide | 2.5 | 2.5 | 2.5 | 2.5 | 2.5 |
| Terpene resin |  |  |  |  |  |
| Antiaging agent | 2 | 2 | 2 | 2 | 2 |

TABLE 1-continued

| | | | | | |
|---|---|---|---|---|---|
| Process oil | 10 | 10 | 10 | 10 | 10 |
| Vulcanization accelerator 1 | 2 | 2 | 2 | 2 | 2 |
| Vulcanization accelerator 2 | 1 | 1 | 1 | 1 | 1 |
| Sulfur | 2 | 2 | 2 | 2 | 2 |

Evaluation items (displayed as index)

| | | | | | |
|---|---|---|---|---|---|
| Wet performance | 100 | 94 | 95 | 98 | 100 |
| Rolling resistance | 100 | 105 | 104 | 101 | 100 |
| Mooney viscosity | 100 | 105 | 103 | 118 | 114 |
| Mooney scorch | 100 | 96 | 98 | 85 | 87 |

| | Comparative Example 5 | Comparative Example 6 | Comparative Example 7 | Comparative Example 8 |
|---|---|---|---|---|
| SBR (rubber content shown in parentheses) | 96.3 (70) | 96.3 (70) | 96.3 (70) | 96.3 (70) |
| BR | 30 | 30 | 30 | 30 |
| Silica | 80 | 80 | 80 | 80 |
| Carbon black | 10 | 10 | 10 | 10 |
| Comparative silane coupling agent 1 | | | | |
| Comparative silane coupling agent 2 | 8.8 (11%) | | | |
| Silane coupling agent 1 | | 8.8 (11%) | 8.8 (11%) | |
| Silane coupling agent 2 | | | | 20 (25%) |
| Silane coupling agent 3 | | | | |
| Comparative silane coupling agent 3 | | | | |
| Comparative silane coupling agent 4 | | | | |
| Comparative alkylsilane 1 | | | 2.4 (3%) | |
| Alkylsilane 1 | 2.4 (3%) | | | 2.4 (3%) |
| Stearic acid | 2.5 | 2.5 | 2.5 | 2.5 |
| Zinc oxide | 2.5 | 2.5 | 2.5 | 2.5 |
| Terpene resin | | | | |
| Antiaging agent | 2 | 2 | 2 | 2 |
| Process oil | 10 | 10 | 10 | 10 |
| Vulcanization accelerator 1 | 2 | 2 | 2 | 2 |
| Vulcanization accelerator 2 | 1 | 1 | 1 | 1 |
| Sulfur | 2 | 2 | 2 | 2 |
| Wet performance | 102 | 97 | 99 | 113 |
| Rolling resistance | 98 | 102 | 100 | 83 |
| Mooney viscosity | 110 | 90 | 87 | 103 |
| Mooney scorch | 90 | 110 | 113 | 98 |

| | Comparative Example 9 | Comparative Example 10 | Comparative Example 11 | Working Example 1 |
|---|---|---|---|---|
| SBR (rubber content shown in parentheses) | 96.3 (70) | 96.3 (70) | 96.3 (70) | 96.3 (70) |
| BR | 30 | 30 | 30 | 30 |
| Silica | 40 | 80 | 80 | 80 |
| Carbon black | 50 | 10 | 10 | 10 |
| Comparative silane coupling agent 1 | | | | |
| Comparative silane coupling agent 2 | | | | |
| Silane coupling agent 1 | | | | 8.8 (11%) |
| Silane coupling agent 2 | 4.4 (11%) | | | |
| Silane coupling agent 3 | | | | |
| Comparative silane coupling agent 3 | | 8.8 (11%) | | |
| Comparative silane coupling agent 4 | | | 8.8 (11%) | |
| Comparative alkylsilane 1 | | | | |
| Alkylsilane 1 | 1.2 (3%) | 2.4 (3%) | 2.4 (3%) | 2.4 (3%) |
| Stearic acid | 2.5 | 2.5 | 2.5 | 2.5 |
| Zinc oxide | 2.5 | 2.5 | 2.5 | 2.5 |
| Terpene resin | | | | |
| Antiaging agent | 2 | 2 | 2 | 2 |
| Process oil | 10 | 10 | 10 | 10 |
| Vulcanization accelerator 1 | 2 | 2 | 2 | 2 |
| Vulcanization accelerator 2 | 1 | 1 | 1 | 1 |
| Sulfur | 2 | 2 | 2 | 2 |
| Wet performance | 87 | 99 | 98 | 110 |
| Rolling resistance | 105 | 98 | 100 | 90 |
| Mooney viscosity | 85 | 98 | 99 | 77 |
| Mooney scorch | 125 | 102 | 101 | 123 |

| | Working Example 2 | Working Example 3 | Working Example 4 | Working Example 5 |
|---|---|---|---|---|
| SBR (rubber content shown in parentheses) | 96.3 (70) | 96.3 (70) | 96.3 (70) | 96.3 (70) |
| BR | 30 | 30 | 30 | 30 |

TABLE 1-continued

| | | | | |
|---|---|---|---|---|
| Silica | 80 | 80 | 80 | 80 |
| Carbon black | 10 | 10 | 10 | 10 |
| Comparative silane coupling agent 1 | | | | |
| Comparative silane coupling agent 2 | | | | |
| Silane coupling agent 1 | | | 12.8 (16%) | |
| Silane coupling agent 2 | 8.8 (11%) | | | 8.8 (11%) |
| Silane coupling agent 3 | | 8.8 (11%) | | |
| Comparative silane coupling agent 3 | | | | |
| Comparative silane coupling agent 4 | | | | |
| Comparative alkylsilane 1 | | | | |
| Alkylsilane 1 | 2.4 (3%) | 2.4 (3%) | 8 (10%) | 2.4 (3%) |
| Stearic acid | 2.5 | 2.5 | 2.5 | 2.5 |
| Zinc oxide | 2.5 | 2.5 | 2.5 | 2.5 |
| Terpene resin | | | | 5 |
| Antiaging agent | 2 | 2 | 2 | 2 |
| Process oil | 10 | 10 | 10 | 10 |
| Vulcanization accelerator 1 | 2 | 2 | 2 | 2 |
| Vulcanization accelerator 2 | 1 | 1 | 1 | 1 |
| Sulfur | 2 | 2 | 2 | 2 |
| Wet performance | 111 | 108 | 117 | 119 |
| Rolling resistance | 88 | 91 | 82 | 90 |
| Mooney viscosity | 80 | 74 | 78 | 76 |
| Mooney scorch | 119 | 130 | 120 | 120 |

The details of each of the components shown in Table 1 are as follows.

SBR: Styrene-butadiene rubber, E581 (oil extending quantity per 100 parts by mass of the rubber component: 37.5 parts by mass (E581; rubber content per 96.3 parts by mass: 70 parts by mass), weight average molecular weight: 1,200,000, styrene content: 37 mass %, vinyl bond content: 43%, manufactured by the Asahi Kasei Corporation)

BR: Butadiene rubber: Nippol BR 1220 (manufactured by the Zeon Corporation)

Silica: Zeosil Premium 200MP (CTAB adsorption specific surface area: 200 $m^2/g$, manufactured by the Rhodia Corporation)

Carbon black: Show Black N339 (CTAB adsorption specific surface area=90 $m^2/g$, manufactured by Cabot Japan)

Comparative silane coupling agent 1: Si363 (manufactured by Evonik Degussa)

Comparative silane coupling agent 2: 3-mercaptopropyl-trimethoxysilane (KBM-803, manufactured by Shin-Etsu Chemical Co., Ltd.)

Silane coupling agent 1: polysiloxane 1 produced as described above

Silane coupling agent 2: polysiloxane 2 produced as described above

Silane coupling agent 3: polysiloxane 3 produced as described above

Comparative silane coupling agent 3: comparative polysiloxane 1 synthesized as described above Comparative silane coupling agent 4: comparative polysiloxane 4 synthesized as described above Comparative alkylsilane 1: dimethyldiethoxysilane (KBE-22, manufactured by Shin-Etsu Chemical Co., Ltd.)

Alkylsilane 1: octyltriethoxysilane (KBE-3083, manufactured by Shin-Etsu Chemical Co., Ltd.)

Stearic acid: stearic acid beads (manufactured by Nippon Oil & Fats Co., Ltd.)

Zinc oxide: Type 3 zinc flower (manufactured by Seido Chemical Industry Ltd.)

Antiaging agent: N-phenyl-N'-(1,3-dimethylbutyl)-p-phenylenediamine (Santoflex 6PPD, manufactured by Flexsys)

Terpene resin: YS Resin TO125 (manufactured by Yasuhara Chemical Co., Ltd.) (aromatic modified terpene resin, softening point: 125° C.)

Process oil: Extract No. 4 S (manufactured by Showa Shell Seikyu K.K.)

Vulcanization accelerator 1: N-cyclohexyl-2-benzothiazolyl sulfenamide (NOCCELER CZ-G, manufactured by Ouchi Shinko Chemical Industrial Co., Ltd.)

Vulcanization accelerator 2: 1,3-diphenylguanidine (Soxinol D-G, manufactured by Sumitomo Chemical Co., Ltd.)

Sulfur: "Golden Flower" oil-treated sulfur powder (manufactured by Tsurumi Chemical Industry Co., Ltd.)

As is clear from the results shown in Table 1, Comparative Example 3, which contains the comparative silane coupling agent 2 other than a polysiloxane represented by the average composition formula of Formula (1) as a sulfur-containing silane coupling agent and does not contain the alkyl triethoxysilane represented by Formula (I), demonstrated wet performance, low rolling resistance, and processability inferior to those of the reference example. Comparative Example 4, which contains the comparative silane coupling agent 2 and contains the comparative alkylsilane 1 instead of containing the alkyl triethoxysilane represented by Formula (I), demonstrated wet performance and processability slightly superior to those of Comparative Example 3, but the processability was inferior to that of the reference example. Comparative Example 5, which contains the comparative silane coupling agent 2, demonstrated wet performance and low rolling resistance slightly superior to those of Comparative Example 4, but the processability was inferior to that of the reference example.

Comparative Example 1, which contains the comparative silane coupling agent 1 other than a polysiloxane represented by the average composition formula of Formula (1) as a sulfur-containing silane coupling agent and does not contain the alkyl triethoxysilane represented by Formula (I), demonstrated wet performance, low rolling resistance, and processability inferior to those of the reference example. Comparative Example 2, which contains the comparative silane coupling agent 1 and contains the comparative alkylsilane 1 instead of containing the alkyl triethoxysilane represented by Formula (I), demonstrated wet performance, low rolling resistance, and processability slightly superior to those of Comparative Example 1, but the wet performance, low rolling resistance, and processability were inferior to those of the reference example.

Comparative Example 6, which does not contain the alkyl triethoxysilane represented by Formula (I), demonstrated wet performance and low rolling resistance inferior to those of the reference example. Comparative Example 7, which contains the comparative alkylsilane 1 instead of containing the alkyl triethoxysilane represented by Formula (I), demonstrated wet performance, low rolling resistance, and processability slightly superior to those of Comparative Example 6, the wet performance was inferior to that of the reference example.

Comparative Example 8, in which the content of the sulfur-containing silane coupling agent exceeds 20 mass % of the silica content, demonstrated processability inferior to that of the reference example.

Comparative Example 9, in which the silica content is less than 60 parts by mass per 100 parts by mass of the diene rubber, demonstrated wet performance and low rolling resistance inferior to those of the reference example.

Comparative Examples 10 and 11, which contain the comparative silane coupling agent 3 or 4, demonstrated wet performance inferior to that of the reference example.

In contrast, the wet performance, low rolling resistance, and processability were all excellent in Working Examples 1 to 5.

As described above, when a conventional sulfur-containing silane coupling agent and an alkyl triethoxysilane represented by Formula (I) are used in combination, it is possible to form a composition with excellent wet performance, low rolling resistance, and processability. However, when a polysiloxane represented by the average composition formula of Formula (1) and an alkyl triethoxysilane represented by Formula (I) are used in combination as a sulfur-containing silane coupling agent, the effects on wet performance, low rolling resistance, and processability are demonstrated to an even greater degree than when a conventional sulfur-containing silane coupling agent and an alkyl triethoxysilane represented by Formula (I) are used in combination. Therefore, it is thought that a combination of a polysiloxane represented by the average composition formula of Formula (1) and an alkyl triethoxysilane represented by Formula (I) as a sulfur-containing silane coupling agent very substantially contributes to the excellent effects on wet performance, low rolling resistance, and processability.

In addition, Working Example 5, which further contains an aromatic modified terpene resin, demonstrates wet performance and processability even superior to those of Working Example 2.

What is claimed is:

1. A rubber composition for a tire tread comprising:
   a diene rubber;
   a silica;
   a sulfur-containing silane coupling agent; and
   an alkyl triethoxysilane represented by Formula (I);
   a content of the silica being from 60 to 200 parts by mass per 100 parts by mass of the diene rubber,
   the sulfur-containing silane coupling agent being a polysiloxane represented by the following Formula (1);
   a content of the sulfur-containing silane coupling agent being from 1 to 20 mass % relative to the content of the silica, and
   a content of the alkyl triethoxysilane being from 0.2 to 20 mass % of the content of the silica;

$$(A)_a(B)_b(C)_c(D)_d(R^1)_e SiO_{(4-2a-b-c-d-e)/2} \quad (1)$$

wherein Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0<a<1$, $0 \leq b <1$, $0<c <3$, $0<d <1$, $0 \leq e <2$, and $0 <2a +b +c +d +e<4$;

Formula I (I)

wherein in Formula (I), R is an alkyl group having from 7 to 20 carbon atoms.

2. The rubber composition for a tire tread according to claim 1, wherein b is greater than 0 in Formula (1).

3. A pneumatic tire having tire treads formed using the rubber composition for a tire tread described in claim 1.

* * * * *